US007903175B2

(12) United States Patent
Hsin

(10) Patent No.: US 7,903,175 B2
(45) Date of Patent: Mar. 8, 2011

(54) DEVICE AND METHOD FOR ZOOMING IMAGES

(75) Inventor: Don-Chen Hsin, Taoyuan County (TW)

(73) Assignee: Novatek Microelectronics Corp., Hsinchu (TW)

( * ) Notice: Subject to any disclaimer, the term of this patent is extended or adjusted under 35 U.S.C. 154(b) by 1206 days.

(21) Appl. No.: 11/532,541

(22) Filed: Sep. 18, 2006

(65) Prior Publication Data

US 2007/0064155 A1 Mar. 22, 2007

(30) Foreign Application Priority Data

Sep. 19, 2005 (TW) .............................. 94132252 A

(51) Int. Cl.
*H04N 5/262* (2006.01)
*H04N 5/44* (2006.01)

(52) U.S. Cl. .................................... 348/561; 348/240.2

(58) Field of Classification Search .............. 348/240.2, 348/561, 581; 382/298-300; 345/671, 665; 358/1.2, 525, 528, 451
See application file for complete search history.

(56) References Cited

U.S. PATENT DOCUMENTS 4,821,086 A * 4/1989 McNeely et al. ............ 348/566
5,715,013 A * 2/1998 Kang ......................... 348/564
5,739,867 A 4/1998 Eglit
5,781,244 A * 7/1998 Hirose et al. ................ 348/561
5,929,933 A * 7/1999 Takeuchi .................... 348/581
5,933,196 A * 8/1999 Hatano et al. ............... 348/441
5,986,635 A * 11/1999 Naka et al. .................. 715/716
6,781,581 B1 * 8/2004 Lee ........................... 345/213
6,806,914 B1 * 10/2004 Onagawa .................... 348/581
2002/0047923 A1 * 4/2002 Okuno et al. ............... 348/540
2007/0025644 A1 * 2/2007 Wang et al. ................. 382/300

* cited by examiner

*Primary Examiner*—Victor Kostak
(74) *Attorney, Agent, or Firm*—Jianq Chyun IP Office

(57) ABSTRACT

A method for zooming images is provided. The method is suitable for altering the size of a source image frame in both horizontal and vertical directions to generate a destination image frame. The method for zooming images includes the following steps. First, the frequency of a horizontal sync signal is multiplied to generate an operating clock signal, wherein the horizontal sync signal is synchronized with the source image frame. Next, the source image frame is sampled by the operating clock signal to generate a sampled image frame. Then, a horizontal zooming operation is performed on the sampled image frame by using the operating clock signal to generate a horizontal image frame. Afterwards, a vertical zooming operation is performed on the horizontal image frame by using the operating clock signal to generate a vertical image frame. Finally, the vertical image frame is output as the destination image frame.

12 Claims, 2 Drawing Sheets

DEVICE AND METHOD FOR ZOOMING IMAGES

CROSS-REFERENCE TO RELATED APPLICATION

This application claims the priority benefit of Taiwan application serial no. 94132252, filed on Sep. 19, 2005. All disclosure of the Taiwan application is incorporated herein by reference.

BACKGROUND OF THE INVENTION

1. Field of the Invention

The present invention relates to a device for zooming images, and more particularly, to a device for zooming images by using a single clock and a method thereof.

2. Description of the Related Art

The image zooming device is commonly used to convert a source image into a destination image with a different size, in which the size of the image is generally defined as the length of the image multiplied by the width of the image, and a pixel is commonly used as an unit of the length and width of the image. The source image is either a graphic image generated by the computer or a video frame generated by the television. In addition, the source image is generally composed of one or more continuous frames, and each frame contains multiple scanning line data.

Figure 1:
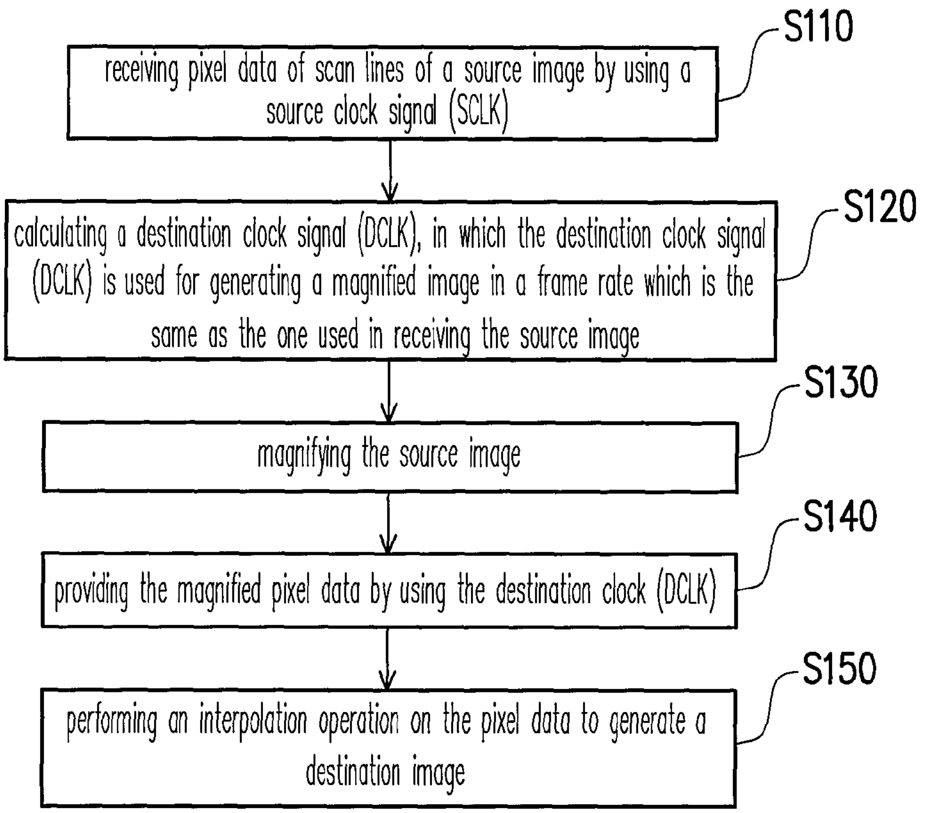
FIG. 1 (PRIOR ART)

FIG. 1 schematically illustrates a flow chart of a conventional method for zooming images that had been disclosed in U.S. Pat. No. 5,739,867. Referring to FIG. 1, first in step S110, pixel data of scan lines of a source image are received by using a source clock signal (SCLK). In step S120, a destination clock signal (DCLK) is calculated. The destination clock signal (DCLK) is used for generating a magnified image in a frame rate which is the same as the one used in receiving the source image. In step S130, the source image is magnified in both horizontal and vertical directions. A commonly used magnifying technique comprises the steps of copying the pixel data, and using the coped extra pixel data and the pixel data of the source image to generate the magnified image. In step S140, a magnified pixel data is provided by using the object clock signal (DCLK), thus the magnified image is generated in the frame rate which is the same as the one used in receiving the source image. Finally, in step S150, if it is required to be displayed on the display, an interpolation operation is performed on the magnified image pixel data in order to generate the destination image.

The conventional technique mentioned above applies a so-called multi-clock domain technique to zoom in and out the images and requires different operating circuits and methods to magnify and shrink the image. Accordingly, the complexity of the circuit is increased.

SUMMARY OF THE INVENTION

Therefore, it is an objective of the present invention to provide a device and a method for zooming images where a single clock is used to simplify the circuit.

In order to achieve the objective mentioned above and others, the present invention provides a method for zooming images. The method for zooming images alters the size of a source image frame in both horizontal and vertical directions to generate a destination image frame. The method for zooming images is suitable for applying in the flat panel display such as a liquid crystal display or a plasma display. The method for zooming images comprises the following steps.

First, the frequency of a horizontal sync signal is multiplied so as to generate an operating clock signal, in which the horizontal sync signal is synchronized with the source image frame. Next, the source image frame is sampled by the operating clock signal to generate a sampled image frame. Then, a horizontal zooming operation is performed on the sampled image frame by using the operating clock signal to generate a horizontal image frame. Afterwards, a vertical zooming operation is performed on the horizontal image frame by using the operating clock signal to generate a vertical image frame. Finally, the vertical image frame is output as the destination image frame. In which, the source image frame is either a graphic image or a video image, and the source image frame is either an analog image or a digital image.

The present invention further provides a device for zooming images suitable for altering the size of a source image frame in both horizontal and vertical directions to generate a destination image frame. The device for zooming images comprises a sampling unit, a horizontal processing unit and a vertical processing unit. In which, the sampling unit receives a source image frame and an operating clock signal, samples the source image frame accordingly to the operating clock signal, and generates a sampled image frame. The horizontal processing unit receives the sampled image frame and the operating clock signal, performs a horizontal zooming operation on the sampled image frame according to the operating clock signal, and generates a horizontal image frame. The vertical processing unit receives the horizontal image frame and the operating clock signal, performs a vertical zooming operation on the horizontal image frame according to the operating clock signal, and generates a vertical image frame. In which, the source image frame is either a graphic image or a video image, and the source image frame is either an analog image or a digital image.

In accordance with a preferred embodiment of the present invention, the device for zooming images further comprises a phase locked loop. The phase locked loop receives a horizontal sync signal, and multiplies the frequency of the horizontal sync signal to generate an operating clock signal, in which the horizontal sync signal is synchronized with the source image frame.

In the device for zooming images according to the preferred embodiment of the present invention, in which the horizontal processing unit comprises a horizontal processor, a memory unit, a read/write arbitrator, a write controller and a read controller. The horizontal processor receives a sampled image frame and the operating clock signal, processes the sampled image frame by using the operating clock signal, and generates a pre horizontal image frame. The read/write arbitrator determines whether to read/write data from/into the memory unit. When it is determined by the read/write arbitrator to write data into the memory unit, the write controller writes the pre horizontal image frame into the memory unit in sync with the operating clock signal according to a write enable signal. When it is determined by the read/write arbitrator to read data from the memory unit, the read controller reads the data from the memory unit in sync with the operating clock signal, and outputs a vertical image frame. In which, the horizontal processor comprises a low pass filter, and the low pass filter performs a smoothing process on the sampled image frame to generate a smoother horizontal zoomed image.

In the present invention, the data input rate is modified by re-sampling the source image frame and a single clock is used as a sampling frequency and the operating frequency of other functional blocks. Comparing to the multi-clock domain method applied in the conventional technique, the present invention can simplify the circuit.

BRIEF DESCRIPTION DRAWINGS

The accompanying drawings are included to provide a further understanding of the invention, and are incorporated in and constitute a part of this specification. The drawings illustrate embodiments of the invention, and together with the description, serve to explain the principles of the invention.

FIG. 1 schematically illustrates a flow chart of a conventional method for zooming images.

Figure 2:
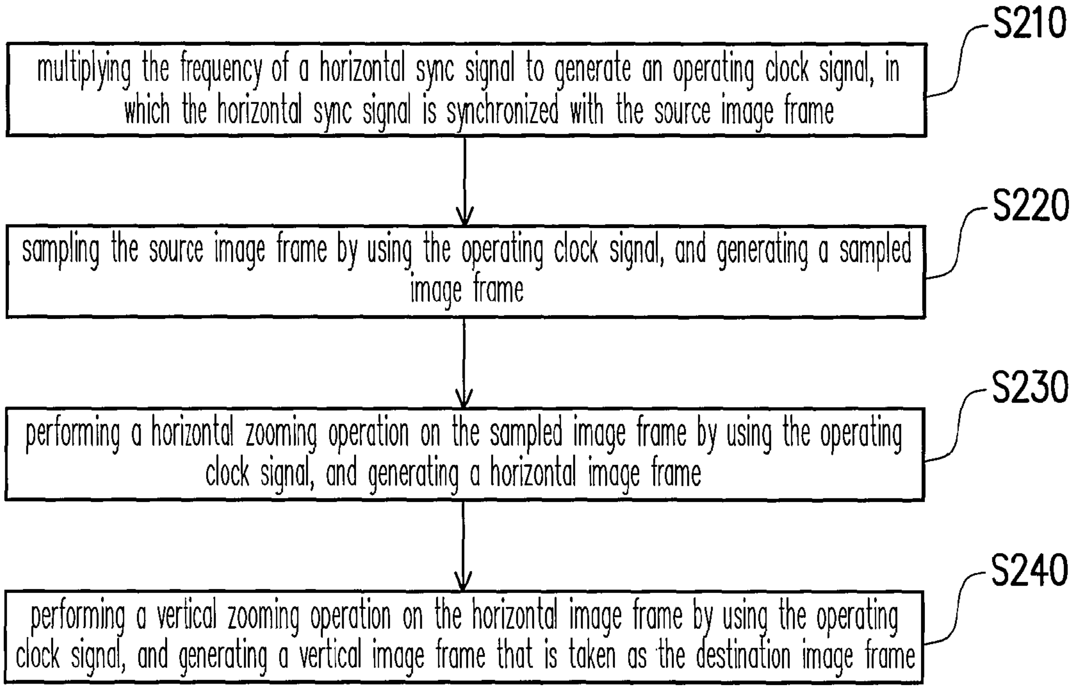

FIG. 2 schematically illustrates a flow chart of a method for zooming images according to a preferred embodiment of the present invention.

Figure 3:
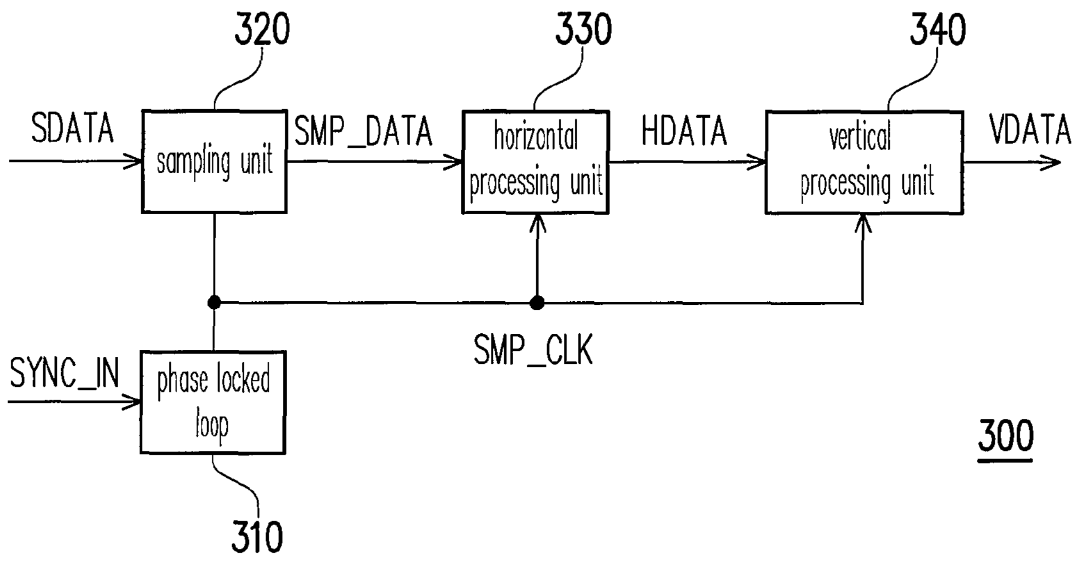

FIG. 3 schematically illustrates a block diagram of a device for zooming images according to a preferred embodiment of the present invention.

Figure 4:
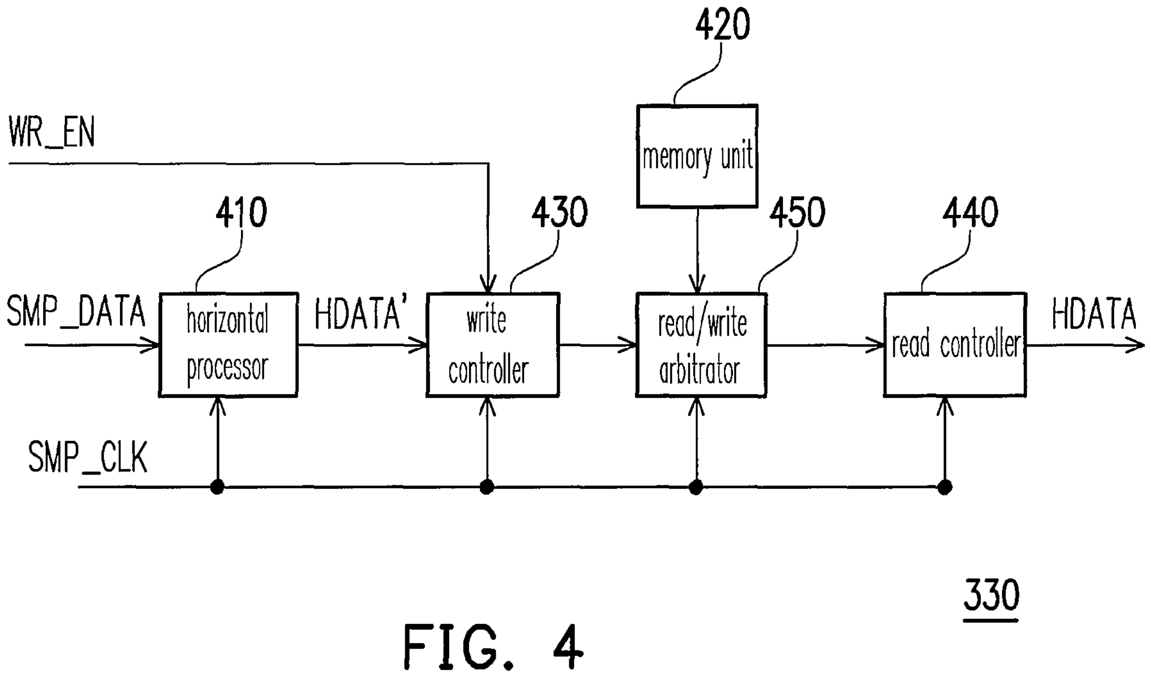

FIG. 4 is a preferred embodiment of a horizontal processing unit in the device for zooming images shown as FIG. 3.

DESCRIPTION PREFERRED EMBODIMENTS

FIG. 2 schematically illustrates a flow chart of a method for zooming images according to a preferred embodiment of the present invention. The method for zooming images alters the size of a source image frame (SDATA) in both horizontal and vertical directions to generate a destination image frame (DDATA). The method for zooming images is suitable for applying in the flat panel display such as the liquid crystal display. In which, the source image frame (SDATA) is either a graphic image generated by the computer or various video images generated by the television. The source image frame (SDATA) is generally composed of one or more continuous frames, and each frame contains multiple scanning line data. Moreover, the source image frame (SDATA) is either an analog image or a digital image.

Referring to FIG. 2, firstly in step S210, the frequency of a horizontal sync signal (SYNC_IN) is multiplied to generate an operating clock signal (SMP_CLK) in which the horizontal sync signal (SYNC_IN) is synchronized with the source image frame (SDATA). Then, in step S220, the source image frame (SDATA) is sampled by the operating clock signal (SMP_CLK) to generate a sampled image frame (SMP-_DATA).

If the source image frame is a digital signal and the frequency of the operating clock signal (SMP_CLK) is multiple integer times of the frequency of the horizontal sync signal (SYNC_IN), the samples of the source image frame (SDATA) increases after the re-sampling to zoom in an image in the source image frame (SDATA). On the other hand, if the source image frame is a digital signal and the frequency of the operating clock signal (SMP_CLK) is multiple integer times of the frequency of the horizontal sync signal (SYNC_IN), the samples of the source image frame (SDATA) decreases after the re-sampling to zoom out an image in the source image frame (SDATA).

In step S230, a horizontal zooming operation is performed on a sampled image frame (SMP_DATA) by using the operating clock signal (SMP_CLK) to generate a horizontal image frame (HDATA). In step S240, a vertical zooming operation is performed on the horizontal image frame (HDATA) by using the operating clock signal (SMP_CLK) to generate a vertical image frame (VDATA).

Accordingly, the source image frame (SDATA) is re-sampled by the operating clock signal (SMP_CLK), such that the data flow is preliminarily controlled. In addition, the image zooming function is accomplished by performing a horizontal filtering operation and a vertical zooming operation on the sampled image frame obtained from the re-sampling operation. Finally, the vertical image frame (VDATA) is directly output as the destination image frame (DDATA).

FIG. 3 schematically illustrates a block diagram of a device for zooming images according to a preferred embodiment of the present invention. Referring to FIG. 3, the device for zooming images 300 comprises a phase locked loop 310, a sampling Unit 320, a horizontal processing unit 330 and a vertical processing unit 340. The phase locked loop 310 receives a horizontal sync signal (SYNC_IN) and multiplies the frequency of the horizontal sync signal (SYNC_IN) to generate an operating clock signal (SMP_CLK). The sampling unit 320 receives a source image frame (SDATA) and the operating clock signal (SMP_CLK), samples the source image frame (SDATA) using the operating clock signal (SMP_CLK) as a sampling frequency, and finally outputs a sampled image frame (SMP_DATA). The horizontal sync signal (SYNC_IN) is synchronized with the source image frame (SDATA).

Since the sampled image frame (SMP_DATA) is obtained from sampling the source image frame by using the operating clock signal (SMP_CLK) as a sampling frequency, the remaining devices all use the operating clock signal (SMP-_CLK) as its operating frequency. The horizontal processing unit 330 receives the sampled image frame (SMP_DATA), and performs a horizontal zooming operation on the sampled image frame (SMP_DATA) to generate a horizontal image frame (HDATA). The vertical processing unit 340 receives the horizontal image frame (HDATA), and performs a vertical zooming operation on the horizontal image frame (HDATA) to generate a vertical image frame (VDATA). Finally, the vertical image frame (VDATA) is directly output as a destination image frame (DDATA).

FIG. 4 is a preferred embodiment of a horizontal processing unit 330 in the device for zooming images 300 shown as FIG. 3. Referring to FIG. 4, the horizontal processing unit 330 comprises a horizontal processor 410, a memory unit 420, a write controller 430, a read controller 440 and a read/write arbitrator 450. The horizontal processor 410, the write controller 430, the read controller 440, and the read/write arbitrator 450 all use the operating clock signal (SMP_CLK) as its operating frequency. The horizontal processor 330 receives and processes the sampled image frame (SMP_DATA) to generate the horizontal image frame (HDATA). If the horizontal processor 410 includes a low pass filter (not shown herein), the image is smoother because the high frequency portion of the sampled image frame is filtered out after passing through the low pass filter.

The read/write arbitrator 450 determines whether to read or write data from/to the memory unit 420. If it is determined by the read/write arbitrator 450 to write data into the memory unit 420, a pre horizontal image frame (HDATA') is written into the memory 420 by the write controller 430 according to a write enable signal (WR_EN). In this case, the amount of the pre horizontal image frame (HDATA') data written into the memory unit 420 is controlled by the write enable signal WR_EN, such that an appropriate data rate is provided. When it is determined by the read/write arbitrator 450 to read data from the memory unit 420, the data is read from the memory unit 420 by the read controller 440 and a horizontal image frame (HDATA) is provided. Finally, the horizontal image frame (HDATA) is directly output as a destination image frame (DDATA). Alternatively, a vertical interpolation operation is performed on the horizontal image frame (HDATA) to generate a vertical image frame (VDATA), and the vertical image frame (VDATA) is output as the destination image frame (DDATA).

In summary, in the present invention, the data input rate is modified by re-sampling the source image frame and a single clock is used as a sampling frequency and the operating frequency of other functional blocks. Comparing to the multi-clock domain method applied in the conventional technique, the present invention can simplify the circuit.

Although the invention has been described with reference to a particular embodiment thereof, it will be apparent to one of the ordinary skills in the art that modifications to the described embodiment may be made without departing from the spirit of the invention. Accordingly, the scope of the invention will be defined by the attached claims not by the above detailed description.

What is claimed is:

1. A method for zooming images suitable for altering the size of a source image frame in both horizontal and vertical directions to generate a destination image frame, the method for zooming images comprising:

multiplying a frequency of a horizontal sync signal by N to generate an operating clock signal for zooming in the source image frame and dividing the frequency of the horizontal sync signal by N to generate the operating clock signal for zooming out the source image frame, wherein the horizontal sync signal is synchronized with the source image frame, N is an integer and N is greater than 1;

sampling the source image frame by using the operating clock signal and generating a sampled image frame;

performing a horizontal zooming operation on the sampled image frame by using the operating clock signal, and generating a horizontal image frame; and performing a vertical zooming operation on the horizontal image frame by using the operating clock signal, and generating a vertical image frame.

2. The method for zooming images according to claim 1, further comprising taking the vertical image frame as the destination image frame.

3. The method for zooming images according to claim 1, further comprising performing an interpolation operation on the vertical image frame so as to generate the destination image frame.

4. The method for zooming images according to claim 1, further being suitable for a flat panel display.

5. The method for zooming images according to claim 1, wherein the source image frame is either a graphic image or a video image.

6. The method for zooming images according to claim 1, wherein the source image frame is either an analog image or a digital image.

7. A device for zooming images suitable for altering the size of a source image frame in both horizontal and vertical directions to generate a destination image frame, the device for zooming images comprising:

a phase locked loop for receiving a horizontal sync signal and multiplying a frequency of the horizontal sync signal by N to generate an operating clock signal for zooming in the source image frame and dividing the frequency of the horizontal sync signal by N to generate the operating clock signal for zooming out the source image frame, wherein the horizontal sync signal is synchronized with the source image frame, N is an integer and N is greater than 1;

a sampling unit for receiving the source image frame and the operating clock signal, sampling the source image frame according to the operating clock signal, and generating a sampled image frame;

a horizontal processing unit for receiving the sampled image frame and the operating clock signal, performing a horizontal zooming operation on the sampled image frame by using the operating clock signal, and generating a horizontal image frame; and a vertical processing unit for receiving the horizontal image frame and the operating clock signal, performing a vertical zooming operation on the horizontal image frame by using the operating clock signal, and generating a vertical image frame as the destination image frame.

8. The device for zooming images according to claim 7, wherein the horizontal processing unit comprises:

a horizontal processor for receiving the sampled image frame and the operating clock signal, sampling the sampled image frame by using the operating clock signal, and generating a pre horizontal image frame;

a memory unit for temporarily storing data;

a read/write arbitrator for determining whether to read/write data from/into the memory unit;

a write controller for receiving a write enable signal and the operating clock signal, wherein when it is determined by the read/write arbitrator to write data into the memory unit, the pre horizontal image frame is written into the memory unit by the write controller in sync with the operating clock signal according to the write enable signal; and a read controller for receiving the operating clock signal, wherein when it is determined by the read/write arbitrator to read data from the memory unit, the data is read from the memory unit by the read controller in sync with the operating clock signal, and the vertical image frame is generated.

9. The device for zooming images according to claim 8, wherein the horizontal processor comprises a low pass filter for performing a smoothing process on the sampled image frame.

10. The device for zooming images according to claim 7, further being suitable for a flat panel display.

11. The device for zooming images according to claim 7, wherein the source image frame is either a graphic image or a video image.

12. The device for zooming images according to claim 7, wherein the source image frame is either an analog image or a digital image.

* * * * *